S. H. HAMILTON.
Corn Harvester.
No. 33,142.
Patented Aug. 27, 1861.
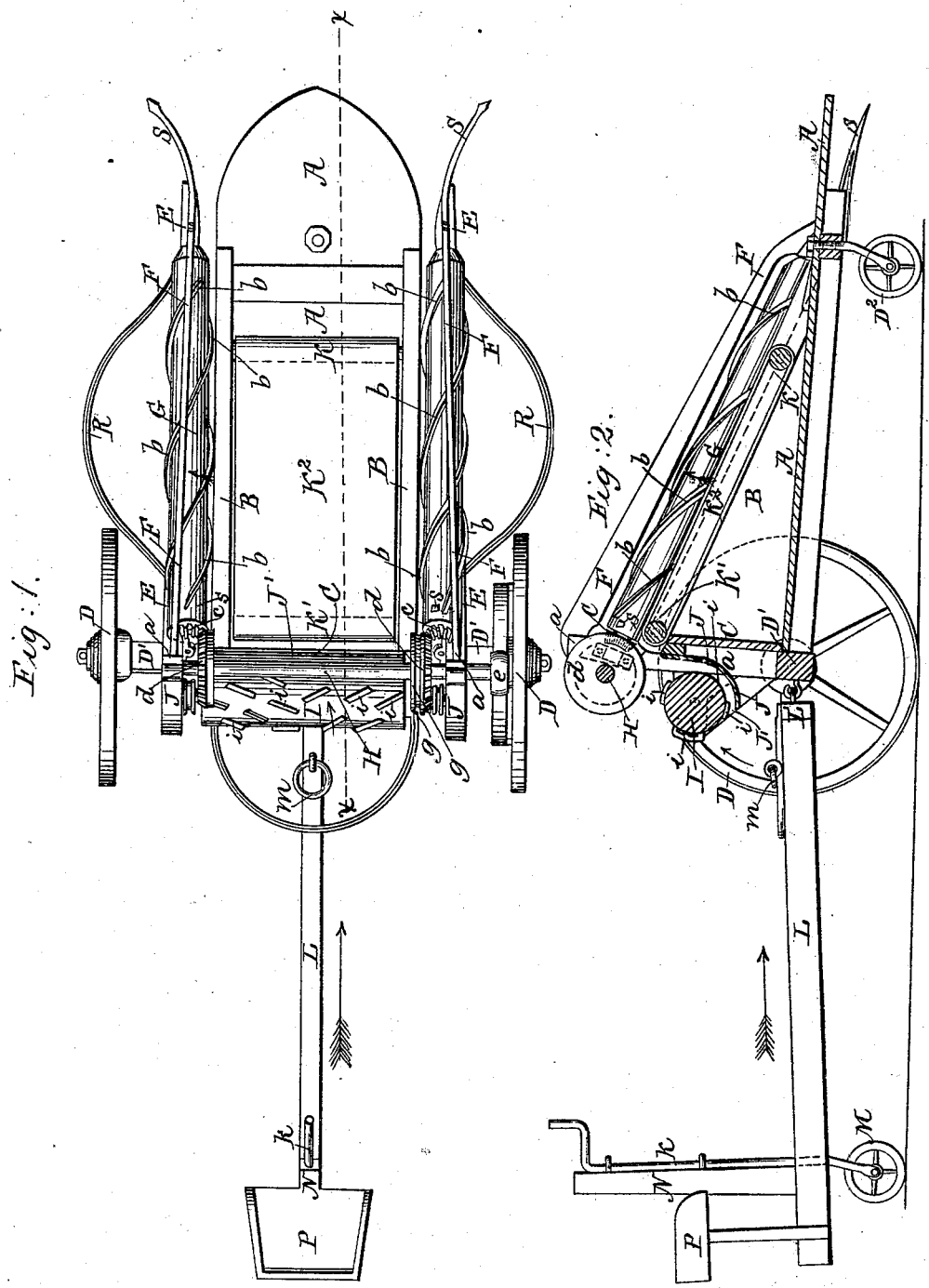
Witnesses
Inventor
S. H. Hamilton
per
Munn & Co.
attorneys

UNITED STATES PATENT OFFICE.

S. H. HAMILTON, OF MACOMB, ILLINOIS.

IMPROVEMENT IN CORN-HARVESTERS.

Specification forming part of Letters Patent No. 33,142, dated August 27, 1861.

*To all whom it may concern:*

Be it known that I, S. H. HAMILTON, of Macomb, in the county of McDonough and State of Illinois, have invented a new and Improved Corn-Harvester; and I do hereby declare that the following is a full, clear, and exact description thereof, reference being had to the accompanying drawings, making a part of this specification, in which—

Figure 1 is a plan view of my improved harvesting-machine; and Fig. 2, a longitudinal section through Fig. 1, in the vertical plane indicated by red lines $x\ x$ thereon.

Similar letters of reference indicate corresponding parts in both figures.

The object of this invention is to obtain a machine, which, on being passed through a corn-field, and between the standing corn, will strip the ears of corn from the stalks and gather them into the body of the machine.

The invention also has for its object combining with the body of a corn-harvester a husking apparatus so arranged that after the ears of corn are severed from the stalks the ears will be carried to the husking and shelling apparatus, and divested of their husks, and the corn shelled from the cobs.

The nature of my invention and improvement consists, first, in arranging on each side of the body of a cart, constructed as will be hereinafter fully explained, a rotating and inclined spiral stripper, combined with gathering-forks, and a stripping-bar for gathering the stalks of standing corn, severing the ears therefrom, and dropping the ears and shelled corn into the body of the cart, as will be hereinafter fully described; and, secondly, in arranging within the body of the machine an endless apron inclining forward, and combined with a husking and shelling apparatus at the rear end of the machine, constructed and operating as will be hereinafter described.

To enable those skilled in the art to make and use my invention, I will proceed to describe its construction and operation.

The body of the cart consists of a bottom, A, which inclines slightly forward, and two side-boards, B B', the edges of which also incline forward. The tail-board C extends up as high as the highest part of the inclined sides B B, and the ends of this tail-board project out some distance from each side of the side-boards. This wagon-body is mounted at its rear end on two large wheels, D D, which are on the ends of the axle-tree D', and at or near its front end on a caster-wheel, $D^2$, which is allowed to turn freely in guiding the machine. On each side of and parallel with the sides of the cart-body is a long beam, E, which extends from the front of the axle-tree D' out near the front end of the cart. These two longitudinal beams, E E, are well braced, and held rigidly in place, and between these beams and the sides of the cart-body are spaces large enough to allow the rows of standing corn-stalks to pass in them as the machine is propelled between the rows of corn. The width of the cart-body should be equal to the width of the rows of corn, so that the beams E E will gather in two rows at a time.

F F are flat bars, which are secured at their front ends to the front ends of the beams E E and proceed back to the rear end of the cart-body, and are secured to the upper ends of perpendicular posts $a\ a$ at their rear ends. The bars F F are thus inclined from their rear ends toward their front ends, and they serve as braces for the beams E E. Besides, they assist in severing the ears of corn from their stalks, which pass between these bars and the sides of the cart. Bars F F are arranged above the inclined plane of the sides of the cart-body, and directly under these bars F F, and in the same plane, are cylindrical bars G G, which have their bearings in the ends of the beams E E and posts $a\ a$, respectively. These bars G G have ribs $b\ b$, arranged spirally around them, carried from end to end of each bar, which ribs are in cross-section quadrangular, and their angles are kept sharp. Bars G G may be made cylindrical; or they may taper from their upper to their lower ends; and they should be brought so near to the lower edges of bars F F and upper edges of the sides B B that the ribs $b\ b$ on these bars G G will tear the corn from the stalks and deposit the corn in the ear into the cart-body. At the upper or rear ends of the spirally-ribbed bars G G bevel-spur wheels $c\ c$ are secured, the teeth of which engage with the teeth of large bevel-spur wheels $d\ d'$, which are keyed to a horizontal driving-shaft, H, extending transversely across the rear end of the machine, and having its end bearings in boxes, which are secured to the two posts $a\ a$. One end of the shaft H projects out from one side of the machine, and a small pulley, *e*, is keyed to it, over which a belt passes, that also passes over a large circular flange which is secured to the inside of one of carriage-wheels D, concentric with the axis of its wheel. The shaft H will thus receive a rotary motion from the wheel B when the machine is moved along, and this shaft H will transmit rotary motion to the ribbed bars G G in the direction indicated by the arrows in Fig. 1 of the drawings.

Below the shaft H and outside of the tail-board C of the cart-body a cylinder, I, is arranged, which has its end bearings in brackets J J, projecting out from the posts *a a*, and below this cylinder and secured to the tail-board C is a concave, J′, which, with the cylinder I, forms the husking apparatus for removing the husks from the ears of corn, as will be hereinafter explained.

Near the front end of the machine, and extending transversely across the sides of the cart, is a roller, K, and at the upper and rear end of the cart, is another roller, K′. Over these two rollers an endless slatted apron, $K^2$, is stretched when the husking apparatus is to be used. This apron $K^2$ will carry the corn back as fast as it is severed from the stalks and deposit it into the husking and shelling apparatus. The bevel-spur wheel *d′* on shaft H carries a grooved pulley, *g*, over which passes a band that is carried around a pulley, *g′*, on the shaft of the husking-cylinder I. (Shown in Fig. 1 of the drawings.) The cylinder I thus receives a rapid rotary motion in the direction indicated by the arrows in Figs. 1 and 2. The periphery of cylinder I is furnished with short ribs *i i i*, secured obliquely to the axis of the cylinder, and arranged in any suitable manner found best suited to the tearing of the husks from the ears of corn and the detaching of the corn from the cobs. The inside surface of the concave J′ may also be provided with ribs or serrations, to assist the cylinder I in the operation of tearing the husks from the ears of corn and shelling the corn from the cobs.

When the husking apparatus is used, suitable provision will be made for receiving the ears of corn, and also the husks, after they pass through the husking apparatus.

L represents a long beam having a cross-head, L′, properly secured and braced on its front end, and to the ends of this cross-piece L′ two eyes are secured, which attach the front end of the beam L to hooks on the axle-tree D′ of the cart. The rear end of the beam L is supported on a guide-wheel, M, which has its bearings in the lower forked end of a perpendicular rod, *k*. This rod *k* passes up through the beam L, and is attached to a post, N, by means of staples, as shown in Fig. 2 of the drawings. On the upper end of rod *k* is a crank-arm, by means of which the driver, who sits in the seat P, is enabled to guide the machine. The horses are hitched to the rear end of the beam L, and also to a ring, *m*, which is secured to the beam L near its front end, so that the horses may be able to move the machine either forward or backward. The curved rods R R, which project from the sides of the cart-body, as shown in Fig. 1, serve as fenders for preventing the wheels D D from running over the cornstalks, and the forked portions S S, which are curved outward from the ends of the beams E E, serve to gather in the stalks and to lift up the fallen stalks. The front end of the cart-bottom A is rounded, as represented in Fig. 1, for the purpose of better gathering the stalks between the beams E E and the sides of the cart-body.

The operation of the entire machine is as follows: Horses are hitched to the beam L behind the cart, as before described, and the driver takes his position in the seat P to drive the horses and control the direction of the machine in its movement over the field. If it is intended that the machine should husk the ears of corn, as well as pluck them from their stalks, the apron $K^2$ is stretched over the rollers K K′, and one of these rollers is rotated, so that the apron will conduct the husk upward and backward and deposit it into the husking and shelling apparatus as fast as it is severed from the stalks and drops on the apron $K^2$. If it is only desired to gather the corn in the husks in the cart-body, this endless apron and also the belt which is passed over the pulleys *g g′* are removed.

The machine is driven in a corn-field between the rows of corn, and as it is moved through the rows the stalks on each row next the machine are gathered between the rotating ribbed cylinders G G and the inclined sides of the cart-body. As the stalks thus pass into the machine the spiral ribs *b b b* on cylinders G G sever the ears of corn from the stalks and deposit the corn into the body of the cart, leaving the stalks standing.

Near the upper ends of the cylinders G G are knives *s s*, which will cut off the tops of the stalks should they be so tall as to be liable to clog the gearing *c c d d′*, which drives the cylinders G G. The knives *s s* are important, because, when their stalks are very high, their tops would be very liable to derange the gearing above mentioned; but the knives *s s* will clip off the tops of such stalks.

Having thus described my invention, what I claim as new, and desire to secure by Letters Patent, is—

1. The combination of inclined ribbed cylinders G G and bars F F with the cart-body having inclined sides B B, and otherwise constructed substantially as and for the purpose set forth.

2. The combination of ribbed cylinders G G, inclined sides B B, bars F F, spur-gearing *c c d d′*, husking and shelling cylinder I, concave J, and the endless corn-carrier $K^2$, all arranged and operating, as a whole, substantially as herein set forth.

G. H. HAMILTON.

Witnesses:
T. B. MAURY,
J. H. NICHOLSON.